United States Patent
Uchida et al.

(10) Patent No.: US 9,645,308 B2
(45) Date of Patent: May 9, 2017

(54) BACKLIGHT DEVICE AND DISPLAY APPARATUS

(71) Applicant: Sakai Display Products Corporation, Sakai-shi, Osaka (JP)

(72) Inventors: Takashi Uchida, Sakai (JP); Yuuki Kawamura, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 41 days.

(21) Appl. No.: 14/758,178

(22) PCT Filed: Mar. 13, 2014

(86) PCT No.: PCT/JP2014/056743
§ 371 (c)(1),
(2) Date: Jun. 26, 2015

(87) PCT Pub. No.: WO2014/148363
PCT Pub. Date: Sep. 25, 2014

(65) Prior Publication Data
US 2015/0378091 A1 Dec. 31, 2015

(30) Foreign Application Priority Data
Mar. 19, 2013 (JP) .................................. 2013-057069

(51) Int. Cl.
*F21V 8/00* (2006.01)
*G02F 1/1333* (2006.01)

(52) U.S. Cl.
CPC .......... *G02B 6/0088* (2013.01); *G02B 6/0085* (2013.01); *G02B 6/0091* (2013.01); *G02F 1/133308* (2013.01); *G02F 2001/133314* (2013.01)

(58) Field of Classification Search
CPC ... G02B 6/0088; G02B 6/0085; G02B 6/0091
See application file for complete search history.

(56) References Cited

U.S. PATENT DOCUMENTS

2010/0073959 A1 3/2010 Hamada
2012/0069263 A1 3/2012 Hur et al.

FOREIGN PATENT DOCUMENTS

WO WO2008090646 A1 7/2008

*Primary Examiner* — Anabel Ton
(74) *Attorney, Agent, or Firm* — Bret E. Field; Bozicevic, Field & Francis LLP

(57) ABSTRACT

The backlight device included in the display apparatus includes a bezel, light guide plate, heat sink (supporting member) located on the rear side of the light guide plate, and a front side chassis (pressing member) located on the front side of the light guide plate to press the light guide plate from the front side. The bezel is fixed to the front side chassis. By a protrusion (suppressing member), the heat sink suppresses the approaching movement of a part of the bezel covering a side part of the heat sink. This also prevents the rotational movement of front part of the bezel and the front side chassis moving forward along with the movement of the part of the bezel. The force of the front side chassis pressing the light guide plate is not lowered, while preventing the light guide plate from shifting its position.

8 Claims, 4 Drawing Sheets

BACKLIGHT DEVICE AND DISPLAY APPARATUS

This application is the national phase under 35 U.S.C. §371 of PCT International Application No. PCT/JP2014/056743 which has an International filing date of Mar. 13, 2014 and designated the United States of America.

BACKGROUND

1. Technical Field

The present invention relates to a backlight device of an edge light type which illuminates a display panel on which an image is displayed, and to a display apparatus.

2. Description of Related Art

A display apparatus which displays an image on the front surface thereof using a non-luminescent display panel such as a liquid-crystal panel includes a backlight device illuminating the display panel from the rear side. An example of the backlight device includes an edge light type in which a light guide plate is located on the rear side of the display panel while a light source is arranged to be opposed to an end face of the light guide plate. In a backlight device of the edge light type, light from the light source enters an end face of the light guide plate, travels inside the light guide plate, and is emitted from one flat surface of the light guide plate. For the light source, a light emitting diode (LED) is used, for example. International Patent Publication No. WO2008/090646 describes a backlight device of the edge light type.

A light guide plate may shift its position in the thickness direction due to a warp or the like caused by expansion/contraction in accordance a change in an environment such as temperature, moisture or the like. When the positional shift of the light guide plate occurs, the position of an end face of the light guide plate is somewhat shifted from the light path which is so defined as to make the light from a light source enter the end face of the light guide plate, thereby reducing the amount of light entering the end face of the light guide plate, reducing the amount of light for illuminating the display panel, and thus darkening the image display screen. Moreover, light leakage, i.e. light leaking from the end face without entering the light guide plate, causes unevenness in luminance in the display screen, which degrades the displaying quality of an image. Thus, the light guide plate is sandwiched and held between a support member disposed on the rear side and a pressing member for pressing the light guide plate from the front side, thereby suppressing the positional shift of the light guide plate.

SUMMARY OF THE INVENTION

A display apparatus is provided with a bezel covering the peripheral part of the front surface and side surfaces. The bezel may be fixed to a pressing member. For example, in a display apparatus with a slim border, it is difficult to secure a space for fixing a bezel on the front side, and the bezel may be fixed with screws inserted from the side direction.

In the display apparatus having a bezel fixed at the side part of the apparatus, the front part of the bezel may be lifted when an external force is applied to the bezel, for example, when a person grabs the bezel with a hand at the time of assembling or during use of the display apparatus. In such a case, the pressing member to which the bezel is fixed also moves along with the bezel. In the case where the front part of the pressing member is lifted up, the force of the pressing member pressing the light guide plate from the front side is weakened, easily causing a positional shift of the light guide plate. This induces light leakage as well as decrease in brightness and unevenness in luminance on the display screen.

The present invention has been made in view of the circumstances described above, and aims to provide a backlight device and a display apparatus, which can suppress the movement of a bezel to prevent degrading of an image displaying quality due to the positional shift of a light guide plate.

A backlight device according to the present invention, comprising a light source, a light guide plate with an end face where light enters from the light source and with a front face emitting light, a supporting member having a part located on a rear side of the light guide plate to support the light guide plate, a pressing member having a part located on a front side of the light guide plate to press the light guide plate from the front side toward the supporting member, and a bezel fixed to the pressing member and covering a peripheral part of a front side and a side part of the pressing member, is characterized by further comprising a suppressing member located on a rear side of a peripheral part of the pressing member, having a side part covered by a part of the bezel, to suppress a movement of the part of the bezel in an approaching direction.

The backlight device according to the present invention is characterized in that the suppressing member is a part of the support member.

The backlight device according to the present invention is characterized in that the suppressing member is in contact with the bezel.

The backlight device according to the present invention is characterized in that the suppressing member is provided across an entire length in a longitudinal direction of the end face of the light guide plate where light enters.

The backlight device according to the present invention is characterized in that the support member is made of metal, and the light source is fixed to the support member.

A display apparatus according to the present invention is characterized by comprising: a display panel for displaying an image; and the backlight device according to any one of claims 1 to 5 for illuminating the display panel.

According to the present invention, a backlight device in the display apparatus includes a light source, a light guide plate, a pressing member located on the front side of the light guide plate, a bezel covering the peripheral part of the front side and the side part of the pressing member, and a suppressing member located at the rear side of the pressing member to suppress the approach of the bezel covering the side part. This prevents the front part of the bezel and the pressing member from moving in a direction away from the light guide plate as the part of the bezel which covers the suppressing member approaches the suppressing member.

According to another aspect of the present invention, the suppressing member is a part of the support member which supports the light guide plate from the rear side. This prevents the bezel from approaching the support member from the side part.

According to another aspect of the present invention, the suppressing member is in contact with the bezel, which reliably prevents the bezel from approaching the support member.

According to another aspect of the present invention, the suppressing member is provided across the entire length of an end face of the light guide plate where light enters. The movement of the bezel is suppressed at any position in the direction along the end face.

According to a further aspect of the present invention, a light source for making light enter an end face of the light guide plate is fixed to the support member, which dissipates the heat from the light source. The light guide plate is prevented from shifting its position with respect to the support member, thereby preventing the occurrence of light leakage, which is the situation where the light from the light source fixed to the support member leaks without entering an end face of the light guide plate.

According to the present invention, a pressing member which presses a light guide plate is prevented from moving in a direction away from the light guide plate, which avoids a positional shift of the light guide plate. The present invention therefore produces advantageous effects of, for example, preventing the image displaying quality from degrading due to a positional shift of the light guide plate.

The above and further objects and features of the invention will more fully be apparent from the following detailed description with accompanying drawings.

DETAILED DESCRIPTION

Figure 1:
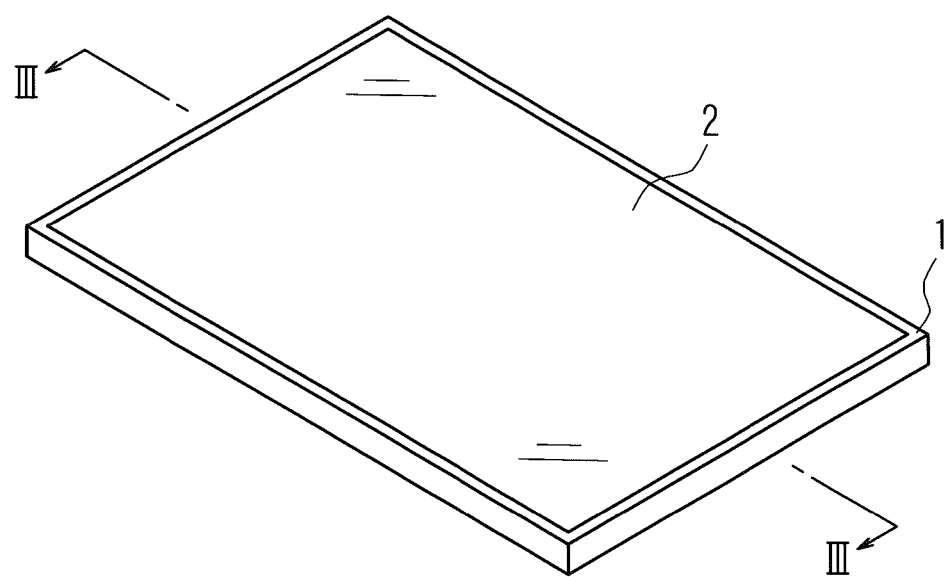
FIG. 1 is a perspective view illustrating an outer appearance of a display apparatus.
Figure 2:
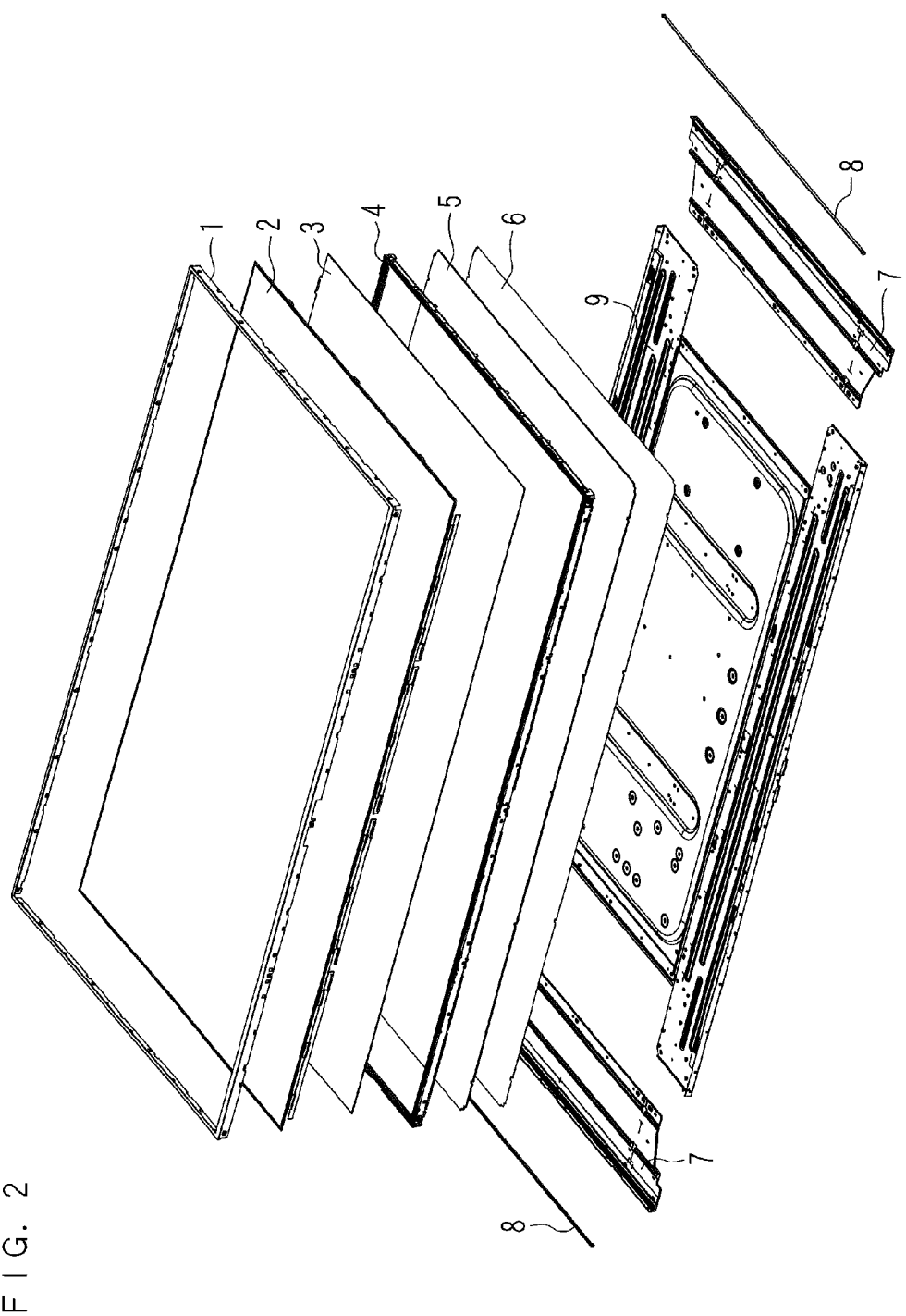
FIG. 2 is an exploded perspective view of a display apparatus.

The present invention will be described in detail below with reference to the drawings illustrating an embodiment thereof. FIG. 1 is a perspective view illustrating an outer appearance of a display apparatus, and FIG. 2 is an exploded perspective view of a display apparatus. The display apparatus is, for example, a television receiver. The front side of the display apparatus corresponds to the upper side in FIGS. 1 and 2. The display apparatus includes a non-luminescent display panel 2 having the shape of a rectangular plate. The display panel 2 is illuminated by a backlight device from the rear side, to display an image. The display panel 2 is, for example, a liquid-crystal panel. The peripheral part of the display panel 2 is covered by the bezel 1. The bezel 1 is a frame-shaped member made of metal, and covers the peripheral part of the front surface and the side surfaces of the display apparatus. At the rear side of the display panel 2, an optical sheet 3 for diffusing and condensing light from the backlight device is disposed. The optical sheet 3 is configured by multiple sheets, including a sheet with a function of diffusing light from the backlight device and a sheet with a function of condensing light, which are layered one on top of another, and allows light to pass therethrough.

A front side chassis 4 of the rectangular frame shape is located at the rear side of the optical sheet 3. The front side chassis 4 is made of resin or metal, and supports the optical sheet 3 from the rear side. The light guide plate 5 having the shape of a rectangular plate is located at the rear side of the front side chassis 4, while a reflection sheet 6 having the same shape as the light guide plate 5 is located at the rear side of the light guide plate 5. Light enters the light guide plate 5 from its end face, and is emitted from its front face. The light emitted from the light guide plate 5 illuminates the display panel 2 from the rear side. At the rear side near the both short hems of the reflection sheet 6, heat sinks 7, 7 made of metal are disposed. A light source 8 for emitting light to enter the light guide plate 5 is attached to each of the heat sinks 7, 7. The light source 8 is so configured that LEDs are mounted on an LED substrate. It is to be noted that the light source 8 may be a light source other than LED. The heat sinks 7, 7 are preferably configured with highly heat-conductive material such as aluminum, so that the heat from the light source 8 can efficiently be dissipated. At the rear side of the reflection sheet 6 and heat sinks 7, 7, a back chassis 9 is disposed. The back chassis 9 is a member made of metal, which forms the back surface of the display apparatus. The bezel 1, front side chassis 4, light guide plate 5, reflection sheet 6, heat sink 7 and light source 8 constitute the backlight device according to the present embodiment.

Figure 3:
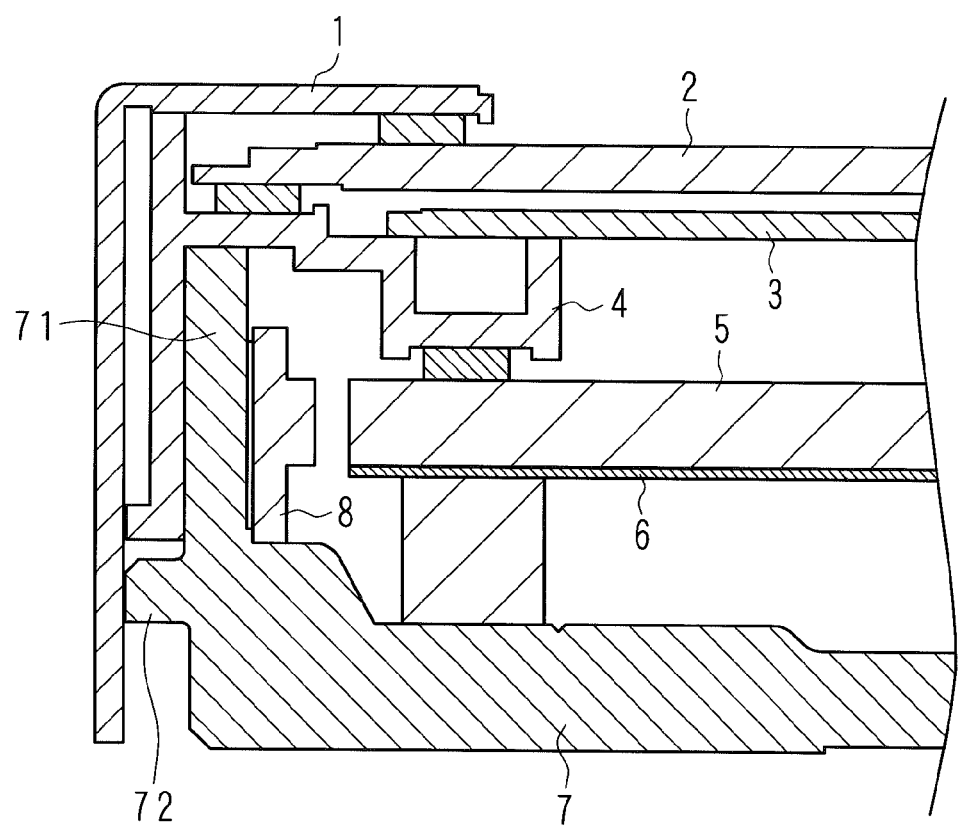
FIG. 3 is an enlarged section view of a part of a cross section along III-III in FIG. 1.

FIG. 3 is an enlarged section view of a part of a cross section along III-III in FIG. 1. FIG. 3 is an enlarged view of a portion around a short hem of the display apparatus in the cross section along III-III in FIG. 1. The upper side of FIG. 3 corresponds to the front side of the display apparatus. A part of the bezel 1 is located on the front side of the peripheral part of the display panel 2, while a portion of the front side chassis 4 is located on the rear side thereof. The bezel 1 and front side chassis 4 sandwich and hold the display panel 2 with a spacer interposed between them. The front side chassis 4 is in contact with a part of the back surface of the optical sheet 3. Moreover, a portion of the front side chassis 4 is located on the front side of the peripheral part of the light guide plate 5, while the heat sink 7 is located on the rear side of the reflection sheet 6. The front side chassis 4 and heat sink 7 sandwich and hold the light guide plate 5 and reflection sheet 6 with a spacer interposed between them. The heat sink 7 supports the light guide plate 5 from the rear side, and the front side chassis 4 defines the position of the light guide plate 5 by pressing the light guide plate 5 from the front side toward the heat sink 7. The light source 8 is located at a position where the LED is opposed to an end face of the light guide plate 5. The front side chassis 4 corresponds to the pressing member, whereas the heat sink 7 corresponds to the support member. While an example form where the optical sheet 3 is located on the front side of the front side chassis 4 is illustrated in the present embodiment, the optical sheet 3 may alternatively be located on the rear side of the front side cassis 4. That is, the present invention may also take a form where the light guide plate 5 and reflection sheet 6 are sandwiched and held between the front side chassis 4 and heat sink 7.

The heat sink 7 has a plate-like connection part 71 protruding forward from a portion along the back surface of the light guide plate 5. The connection part 71 is located at a position on the side part of the light guide plate 5 along an end face of the light guide plate 5 so as to cross a surface including the front face of the light guide plate 5. An end on the front side of the connection part 71 protrudes more forward than the front face of the light guide plate 5, and is partially in contact with the back surface of the front side chassis 4. To the connection part 71, the light source 8 is fixed at a position opposed to the end face of the light guide plate 5. Moreover, a part of the front side chassis 4 protrudes rearward and is located outside the connection part 71. The bezel 1 covers the peripheral part on the front side of the display panel 2 and the front side chassis 4, and also covers the side part of the front side chassis 4. Furthermore, the bezel 1 has a part extending rearward from the part thereof covering the side part of the front side chassis 4, the extending part being located at the side part of the heat sink 7. The bezel 1 and front side chassis 4 are connected to the connection part 71 with screws (not illustrated) inserted from the side direction. That is, the bezel 1 is fixed to the front side chassis 4.

Figure 4:
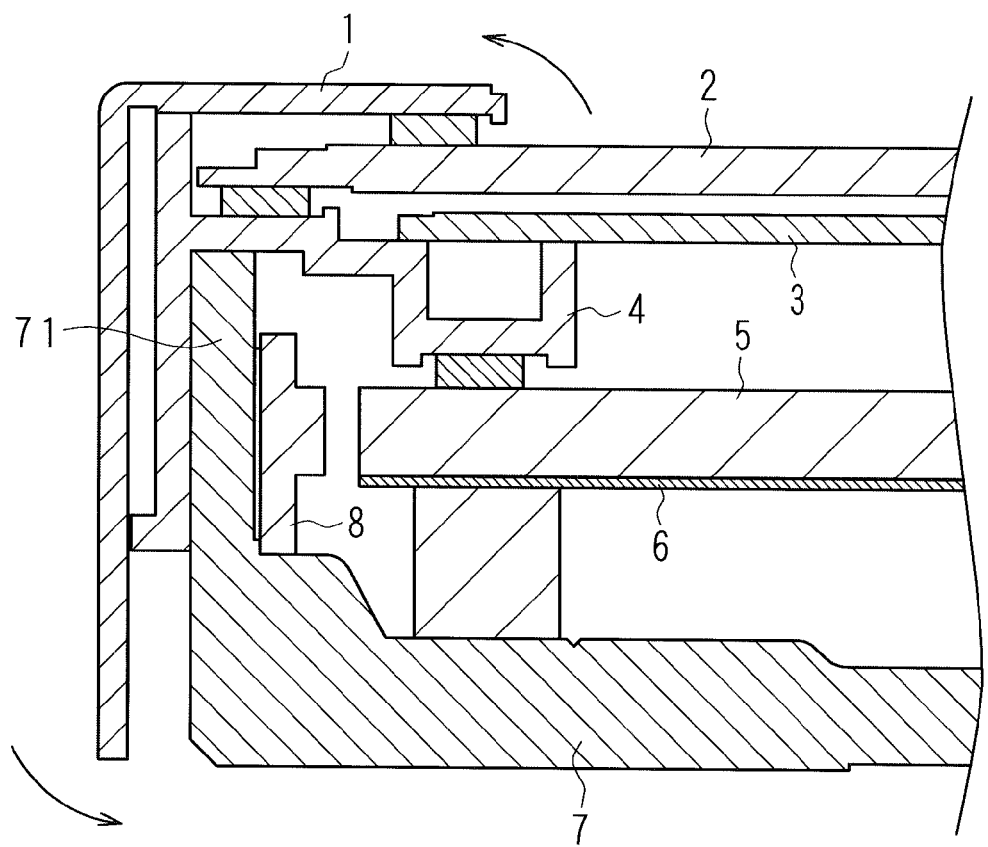
FIG. 4 is a section view of a conventional display apparatus.

FIG. 4 is a section view of a conventional display apparatus. In the conventional display apparatus, in the case where a specific external force is applied to the bezel 1 when, for example, a person grabs the bezel 1 from the front surface with a hand at the time of assembly or during use, the front part of the bezel 1 may be lifted forward. For example, the bezel 1 slightly rotates in the cross section such that, among all the parts of the bezel 1, parts located more forward than the parts fixed with screws from the side direction are separated from the other components of the display apparatus and parts located more backward than the fixed parts approaches the other components. FIG. 4 illustrates the direction in which the bezel 1 moves by an arrow. More specifically, among all the parts of the bezel 1, a part covering the side part of the heat sink 7 of all the components of the bezel 1 moves in the direction approaching the heat sink 7, and accordingly, a part covering the peripheral part of the display panel 2 on the front side moves in the direction away from the display panel 2. In the case where the front part of the bezel 1 moves forward, the front side chassis 4 fixed to the bezel 1 similarly moves along the movement of the bezel 1. That is, the front side chassis 4 moves in a direction away from the light guide plate 5, weakening the force of pressing the light guide plate 5 from the front side, which makes it easy for a positional shift of the light guide plate 5 to occur. If the positional shift of the light guide plate 5 occurs, the position of the end face of the light guide plate 5 is somewhat shifted with respect to the light path from the light source 8, which generates light leakage, in which light leaks from the end face of the light guide plate 5 without entering the end face, and also causes reduction in brightness and unevenness in luminance of the display screen.

In the present embodiment, as illustrated in FIG. 3, the heat sink 7 has a protrusion 72 protruding from the connection part 71 in the side direction. The protrusion 72 is provided along the longitudinal direction of the end face of the light guide plate 5 where light enters, across the entire length of the end face, and makes contact, from inside, with the part of the bezel 1 covering the side part of the heat sink 7. The protrusion 72 is located on the rear side of the peripheral part of the front side chassis 4, and corresponds to a suppressing member for suppressing the movement in the direction in which the part of the bezel 1 covering the side part of the heat sink 7 approaches. As the protrusion 72 is in contact with the bezel 1, the bezel 1 cannot move in the direction of approaching the heat sink 7. This can prevent the part of the bezel 1 covering the side part of the heat sink 7 from approaching the heat sink 7 and the front part of the bezel 1 from moving in the direction away from the display panel 2 accordingly. Therefore, even in the case where a specific external force is applied to the bezel 1, the front part of the bezel 1 is prevented from moving in the direction away from the display panel 2. It is to be noted that the protrusion 72 may have a form of not being in contact with the bezel 1. In this form also, though the bezel 1 can approach the protrusion 72 to some extent, it cannot approach closer than the position where the bezel 1 is in contact with the protrusion 72, which suppress the movement of the bezel 1 in the direction of approaching the heat sink 7, and prevents the front part of the bezel 1 from moving in a direction away from the display panel 2.

In the present embodiment, since the bezel 1 is prevented from moving in a direction away from the display panel 2, the front side chassis 4 is also prevented from moving in a direction away from the light guide plate 5 along with the movement of the bezel 1. This makes it difficult for the pressing force of the front side chassis 4 on the light guide plate 5 from the front side to be lowered, and for the positional shift of the light guide plate 5 to occur. Light leakage caused by the positional shift of the light guide plate 5 is not easily generated, and the amount of light entering the light guide plate 5 from the light source 8 is not reduced. Therefore, reduction in brightness of the display screen due to reduction in the amount of light as well as the occurrence of unevenness in luminance of the display screen due to light leakage are prevented, which further prevents degrading of the image displaying quality in the display apparatus.

Moreover, the protrusion 72 is provided across the entire length along the longitudinal direction of the end face of the light guide plate 5 where light enters. Thus, at any position along the longitudinal direction of the end face where light enters, such movement that the part of the bezel 1 covering the side part of the heat sink 7 approaches the heat sink 7 is suppressed, thereby preventing the front side chassis 4 from moving in a direction away from the light guide plate 5 and also preventing the positional shift of the light guide plate 5. Therefore, at any position of the end face where light enters, the light leakage caused by leakage of the light which is intended to enter the end face of the light guide plate 5 from the light source 8 is not easily generated, thereby reliably preventing the degrading of the image displaying quality in the display apparatus.

While the present embodiment described an example where the heat sink 7 is a support member, the present invention may take a form in which the back chassis 9 is a support member. In this form, the back chassis 9 has a protrusion extending in the side direction up to the position where it makes contact with the bezel 1. Moreover, the shape of the suppressing member may have a shape different from that of the protrusion 72 as long as it can suppress the approaching of the bezel 1. Furthermore, while the present embodiment illustrated that the suppressing member is a part of the supporting member, the present invention may take a form in which the suppressing member is a component different from the supporting member. Also in these alternative forms, the positional shift of the light guide plate 5 is prevented, and thus the image displaying quality in the display apparatus is prevented from degrading.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A backlight device, the backlight device comprising:
a light source;
a light guide plate with an end face where light enters from the light source and with a front face emitting light;
a supporting member having (i) a portion along the back surface of the light guide plate to support the light guide plate and (ii) a plate-like part protruding forward from the portion and having the light source at a position opposed to the end face of the light guide plate;
a pressing member having a part located on a front side of the light guide plate to press the light guide plate from the front side toward the supporting member;

a bezel fixed to the pressing member and covering a peripheral part of a front side and a side part of the pressing member; and a suppressing member, protruding from the plate-like part in the side direction, located at a rear side of a peripheral part of the pressing member, having a side part which is covered by a part of the bezel and contacts, from inside, with the part of the bezel, to suppress a movement of the part of the bezel in an approaching direction to the plate-like part.

2. The backlight device according to claim 1, wherein the suppressing member is a part of the supporting member.

3. The backlight device according to claim 1, wherein the suppressing member is provided across an entire length in a longitudinal direction of the end face of the light guide plate where light enters.

4. The backlight device according to claim 1, wherein the supporting member is made of metal, and the light source is fixed to the support member.

5. A display apparatus, comprising:
a display panel for displaying an image; and
the backlight device according to claim 1 for illuminating the display panel.

6. The backlight device according to claim 1, wherein a part of the pressing member protrudes rearward and is located outside the plate-like part.

7. The backlight device according to claim 1, wherein an end on the front side of the plate-like part protrudes more forward than the front face of the light guide plate.

8. The backlight device according to claim 1, wherein an end on the front side of the plate-like part is partially in contact with the back surface of the pressing member.

* * * * *